Figure 1:
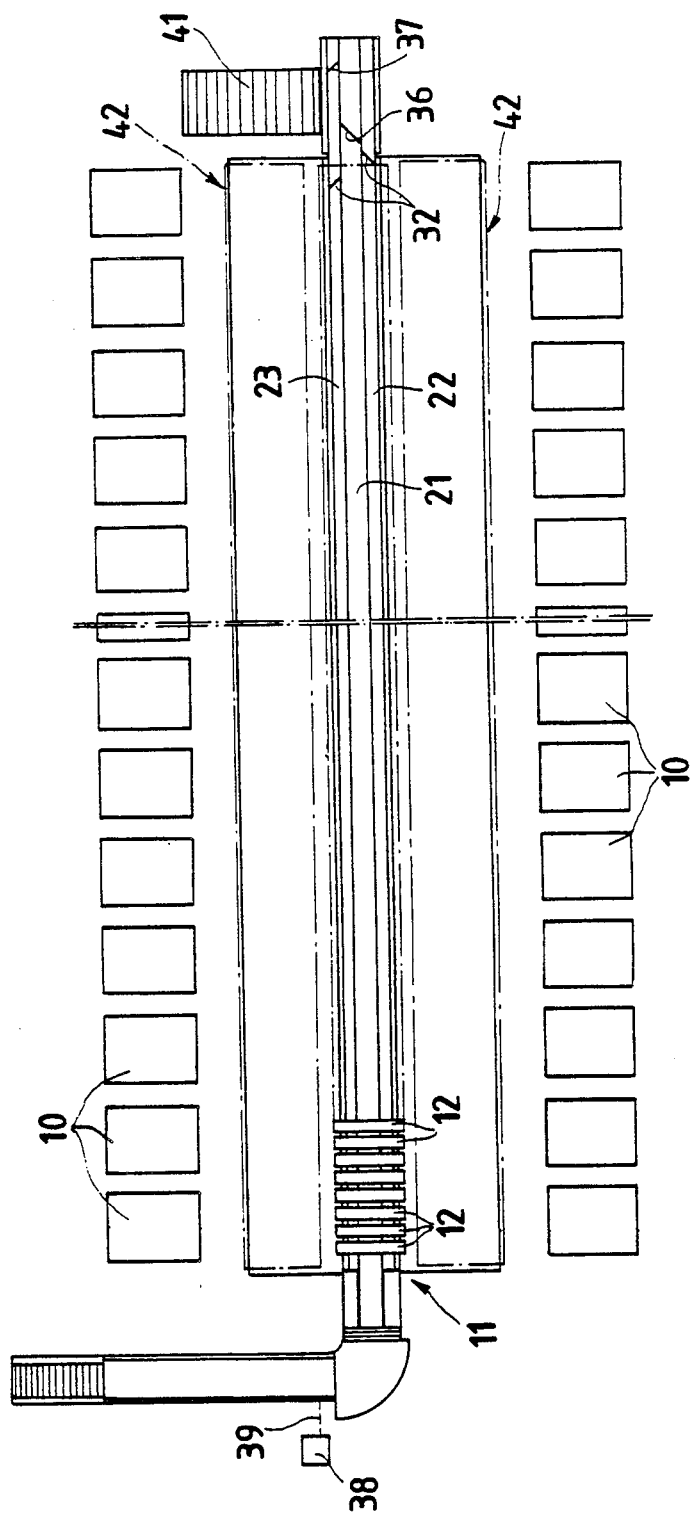

United States Patent [19]

Ballestrazzi et al.

[11] Patent Number: 4,989,719

[45] Date of Patent: Feb. 5, 1991

[54] COMPOSITE CONVEYOR APPARATUS EQUIPPED WITH LATERALLY TILTABLE PLATE ELEMENTS

[75] Inventors: Aris Ballestrazzi; Lamberto Tassi, both of Savignano sul Panaro, Italy

[73] Assignee: Sitma SpA, Spilamberto, Italy

[21] Appl. No.: 348,988

[22] Filed: May 8, 1989

[30] Foreign Application Priority Data

May 9, 1988 [IT] Italy ................... 20505 A/88

[51] Int. Cl.⁵ .................................. B65G 47/46
[52] U.S. Cl. ............................. 198/365; 198/802
[58] Field of Search ............ 198/365, 802, 477.1, 198/366, 370, 367.1

[56] References Cited

U.S. PATENT DOCUMENTS

| | | | |
|---|---|---|---|
| 3,662,874 | 5/1972 | Muller ..................... | 198/802 X |
| 3,669,245 | 6/1972 | Wooten et al. ............ | 198/365 |
| 4,378,062 | 3/1983 | Macrum .................... | 198/365 |

FOREIGN PATENT DOCUMENTS

| | | | |
|---|---|---|---|
| 2037380 | 1/1972 | Fed. Rep. of Germany ...... | 198/365 |
| 2755147 | 6/1978 | Fed. Rep. of Germany ...... | 198/365 |
| 2729724 | 1/1979 | Fed. Rep. of Germany ...... | 198/365 |
| 0236922 | 11/1985 | Japan ............................ | 198/365 |
| 0965916 | 10/1982 | U.S.S.R. ........................ | 198/365 |

Primary Examiner—H. Grant Skaggs
Assistant Examiner—James R. Bidwell
Attorney, Agent, or Firm—Hedman, Gibson, Costigan & Hoare

[57] ABSTRACT

A composite conveyor apparatus, composed of conveyor elements of plate type installed successively to each other and individually and selectively tiltable relatively to both sides of the sliding and advancing direction, so as to carry out in a predetermined and preselected way the delivery of the conveyed products. The tilting of the individual plate conveyor elements at the unloading or outlet region, which is preselected to take place at the right-hand side or at the left-hand side of the advancing path is controlled by way of switching elements, which are actuated by relevant actuators, in their turn caused to act by suitably programmed sensor elements destined to detect the product.

8 Claims, 3 Drawing Sheets

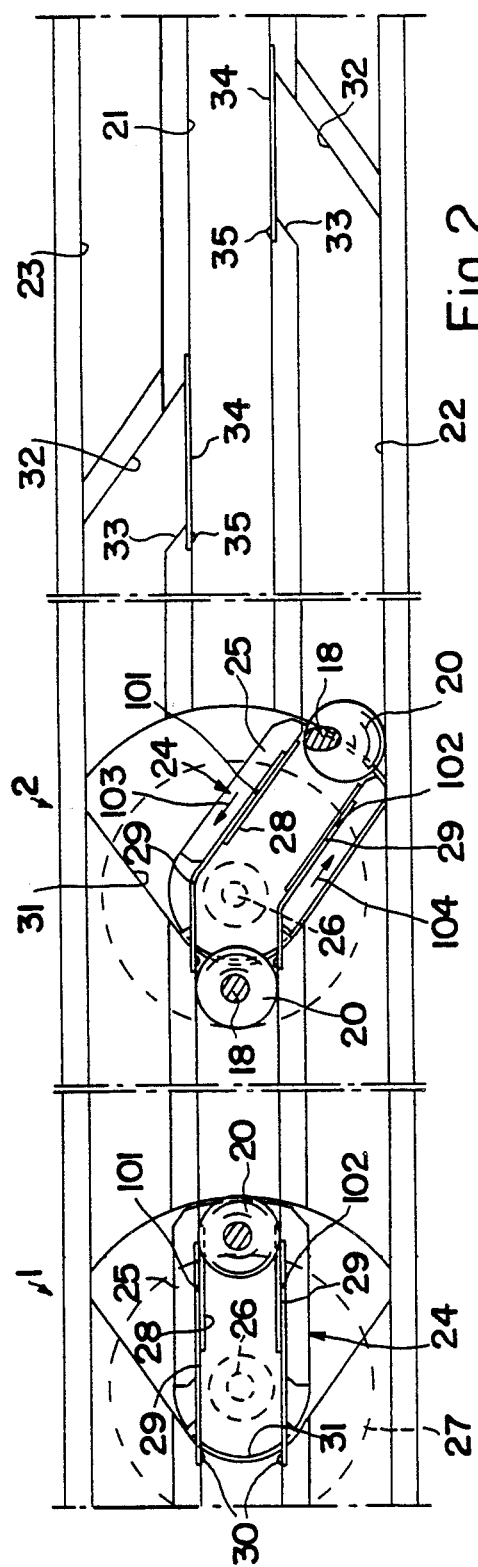
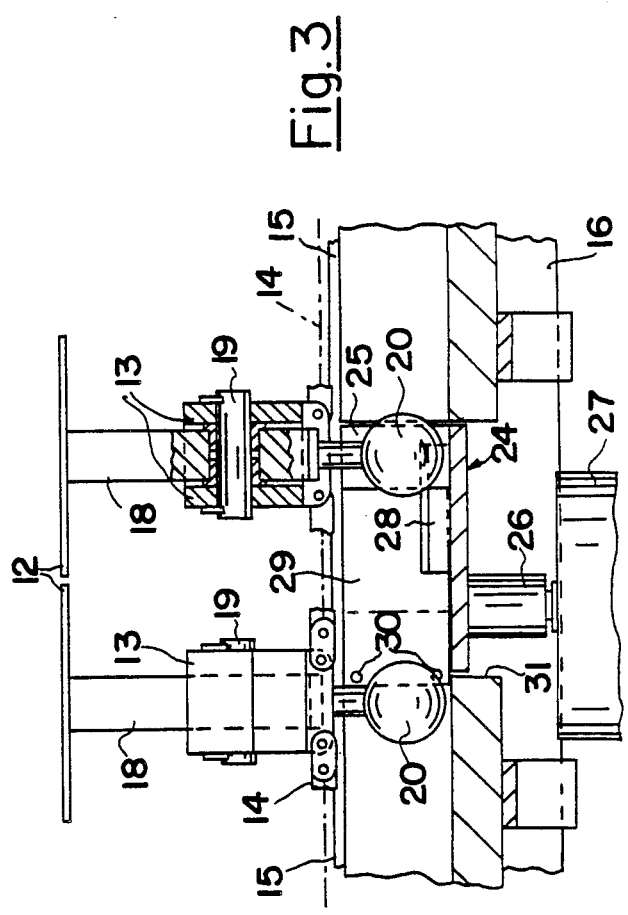
Fig. 2
Fig. 3

COMPOSITE CONVEYOR APPARATUS EQUIPPED WITH LATERALLY TILTABLE PLATE ELEMENTS

The present invention relates to a composite conveyor apparatus equipped with laterally tiltable plate elements.

The problems are known which relate the need for sorting groups of non-homogeneous products into homogeneous sub-groups, which have to be subsequently sent to further different processing steps, or which, more simply, have to be prepared in a so-sorted arrangement in order to be sent to the user.

The need for forming groups of products suitably assorted according to a preselected plan, so that the same product groups are ready for an immediate use, is known as well.

Both these needs are not easy to be solved with the heretofore known conveyor systems, or, at least, they involve considerable structural complications which make them difficult to be managed, and expensive to be built and serviced.

A purpose of the present invention is mainly that of solving the above said problems of predetermined sorting of products, simultaneously providing a conveyor means which can be managed according to both manual and automatic management procedures.

Another purpose is of being able to carry out said product sorting according to a continuous process, with no need for reductions in operating speed, or generation of dead times, which have a considerable adverse impact on the operations costs, and may affect the functionality of the conveyor apparatus, in that they involve continuous changes in motor actuation, halts, start-ups, and still other repeated stresses.

As a further purpose, such a conveyor apparatus, as a machine useable according to an automatic management procedure, should possibly be capable of being controlled by one single operator.

These and still further purposes according to the present invention are achieved by providing a composite conveyor apparatus equipped with laterally tiltable elements of plate type, comprising, on a framework, at least one continuous driving element which is motor-driven, is slidingly arranged according to a closed-loop path on a complementary guide means and which drives a plurality of plate elements positioned successively to each other in order to support and convey products, characterized in that under each one of said plate elements a pin element extends, which gets engaged inside a first sliding guide also provided according to said closed-loop path and integral with said framework, with a horizontal lead of said conveyor apparatus being equipped with switching elements, each of which can be caused to horizontally move to and fro by means of a relevant actuator means, and which are capable of selectively addressing the pin element of at least one plate element inside at least one second sliding guide provided parallel to said first sliding guide, with said first sliding guide and said at least one second sliding guide being connected with each other both by means of said moveable switching elements and by means of stationary diverting walls in order to return said pin element back into said first sliding guide, wherein at the end of said diverting walls between said first sliding guide and said at least one second sliding guide an opening is provided, which is equipped with a wall element pliable into one direction only, with said pin element being additionally rotatably hinged on a transversal support element integral with said at least one driving element.

Figure 4:
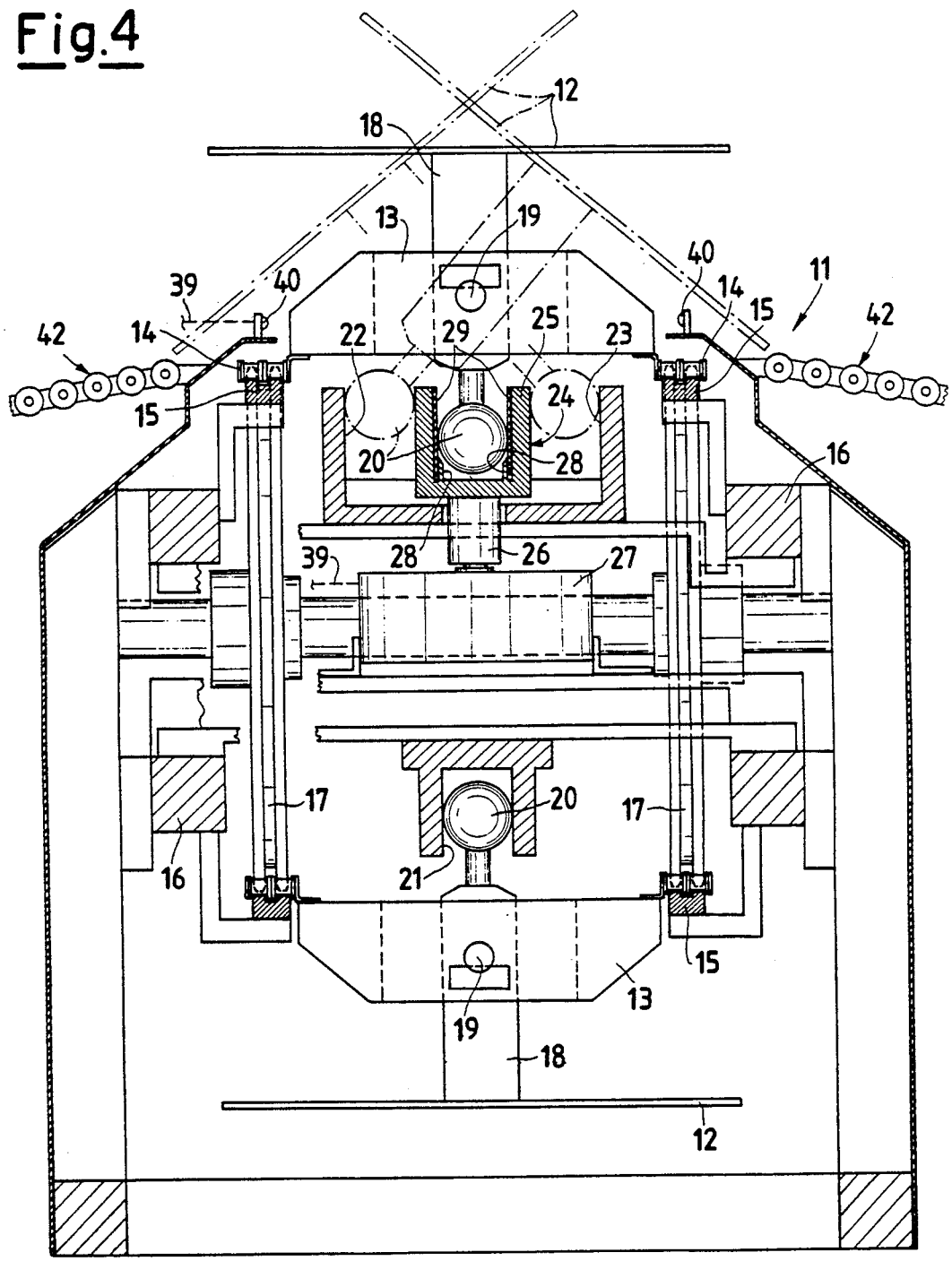

The structural and functional characteristics of a composite conveyor apparatus according to the present invention will be better understood from the following exemplifying and non-limitative disclosure thereof, referred to the hereto attached schematic drawings, in which:

FIG. 1 shows a partially sectional top plan view of a conveyor apparatus according to the present invention, FIG. 2 shows a sectional plan view of a magnified detail of the conveyor apparatus of FIG. 1, FIG. 3 shows a magnified sectional view of a detail of the conveyor apparatus of FIG. 1 seen in side elevation view; and FIG. 4 shows a cross-sectional view of the conveyor apparatus of FIG. 1, in which a different operating position of a conveyor element is shown in chain line.

Referring to the figures, a conveyor apparatus according to the present invention, generally indicated by the reference numeral 11, comprises a plurality of supporting and conveyor elements of plate type 12, which are suitable for receiving products (not shown in the figures) in order to convey them towards unloading stations, schematically indicated by the reference numerals 10 and longitudinally positioned alongside it.

Each one of said plate elements 12 is positioned in succession relative to other similar elements and is positioned integral with a support element 13, which is positioned transversely to, and fastened to, a pair of chains 14, which chains perform the task of acting as continuous driving elements sliding on horizontal planes on complementary guide elements 15 fastened to a framework 16 of the conveyor apparatus. A pair of driving sprocket wheels 17, suitably driven by a motor means (not shown in the figures) drives the pair of chains 14 to move; which pair of chains 14 are positioned according to a closed-loop path throughout the longitudinal length of the apparatus and furthermore run around further return sprocket wheels (not shown in the figures as well); and consequently also drives the plurality of transversal support elements 13 to move with them.

Numerals 1 and 2 indicate two positions of switching element 24. In labelled position 1, the free end portion 101 of a first wall element 29 is in the same position of the free end portion 102 of the second wall element 29. When the switching element 24 is rotated to labelled position 2, the free end portion 101 of the first wall element 29 slides inside its seat as shown by the arrow 103. The free end portion 102 of the second wall element 29 slides inside its seat in the direction opposite arrow 103 as shown by the arrow 104.

Each one of said plate elements 12 is provided with a downwards extending pin element 18 which is rotatably hinged at 19 on a transversal support element 13. The lower free end of this pin element is provided with an appendix, such as, e.g., a ball 20, which is suitable for getting engaged inside a first sliding guide 21 longitudinally provided on the framework of the conveyor apparatus and which also is arranged according to a closed-loop path similar to the closed-loop path of the pair of chains 14. Along the opposite sides of said first sliding guide 21 and parallel to it, second sliding guides 22 and 23, also integral with the framework 16, are provided along at least one upper horizontal lead of said conveyor apparatus.

A plurality of switching elements, generally indicated by the reference numeral 24, are provided along said upper horizontal lead, usually lined up with the first sliding guide 21 (FIG. 2). Each switching element is constituted by a body 25 which can move to and from on a horizontal plane, and from which a pin 26 extends downwards, with said pin 26 being controlled to rotate by an underlying actuator means 27, such as a pneumatic cylinder.

The body 25 has a cross section which has an essentially "U"-shape, and its mutually opposite inner walls are provided with small tooth-shaped guides 28, which are parallel to the inner walls and extend from a base wall; said tooth-shaped guides 28 are suitable for slidingly receiving wall elements 29, which are pliable as thin sheets of metals or of plastic materials, and are fastened at one of their ends only by means of rivetings 30 to side walls of the first sliding guide 21 in order to accomplish the continuity of the guide means.

Of course, each one of said switching elements 24 is positioned in correspondence of openings 31 provided through the walls of the first sliding guide 21. From FIG. 2, one can observe that by means of the actuator means 27 each switching element 24 can be caused to move to and fro by an angle of about 45° on each side, so as to be moved both in correspondence of a second guide means 22, and of a second guide 23, positioned on both opposite parallel sides of the first central sliding guide 21 (FIG. 2).

In the nearby of the end region of the upper horizontal lead of said conveyor apparatus, both second sliding guides 22 and 23 are each one provided with stationary, vertical diverting walls 32 positioned inclined in the direction of movement of the conveyor apparatus, and such as to cause the ball 20 of a pin element 18 to be returned towards the first, central sliding guide 21. Such an action is possible, because at the end of said diverting walls 32 between said first sliding guide 21 and said second sliding guides 22 and 23 an opening 33 is provided, which is provided with a further pliable wall element 34, also consisting, for example, of a thin sheet of metal, fastened at one single end thereof, by means of rivetings 35, to the inner side walls of the first sliding guide 21.

One can understand that thanks to such a fastening, the wall element 34 can be plied and opened only if it is pushed by a pin element coming from either of the second sliding guides 22, 23, and which must return into the central sliding guide 21.

Downstream both said stationary diverting walls 32 a tilting unit is furthermore provided, which makes it possible also those products, or better those plate elements 12, to be unloaded, which may have not been diverted into the second side sliding guides 22 or 23, owing to an operational fault, or inadvertently in case the preselected and necessary unloading step was so programmed as to take place automatically.

For that purpose, the tilting unit comprises a diverting wall 36 installed in an inclined position inside the first sliding guide 21; said wall 36 diverts, through a connection opening similar to the connection opening 33, all of the incoming pin elements 18 towards a second sliding guide (in FIG. 1: the side sliding guide 23), so that all of said plate elements 12 are obliged to laterally tilt and overturn on that side, thus causing any products which accidentally may have not been unloaded at a prior stage to be unloaded onto an evacuating conveyor means 41, acting as a safety exit for the products.

Immediately after, and anyway before the end of the upper horizontal lead of the conveyor apparatus, a further stationary inclined wall 37 installed inside the second selected sliding guide, in this case the guide 23, returns, through a further connecting opening also similar to the opening 33, all of the pin elements into the central guide 21, so that all of the plate elements 12 will slid, lined up with one another, first running around the sprocket wheels at that apparatus end and then running, upside-down, along the bottom horizontal lead of the closed-loop path of the conveyor apparatus.

One should observe that, as hereinabove said, the plate elements 12 should be capable of being tilted and overturned in correspondence of collecting or container elements, mail bags or buffer roll ways, as hereinabove schematically represented as unloading stations 10. For that purpose, from a control panel 38, installed at the loading area of the conveyor apparatus of the present invention, the operator sets, by means of electrical connecting lines 39, the desired unloading sequence, so that the tilting and the overturning of a predetermined plate element can take place towards the preselected unloading station 10. The installation of sensor means 40, such as, e.g., photo-cells, optical readers or magnetic sensors, along the upper horizontal lead of the closed-loop path immediately upstream each switching element 24 makes it possible the individual actuator means 27 of each switching means 24 to be caused to intervene when a predetermined plate element 12 passes in front of it, and consequently the unloading into the preestablished collecting element to take place.

One can thus easily understand how an operator, once that the desired sequence of selection of the products towards the collecting elements 10 is set, feeds the products onto successive plate elements 12. Such plate elements are detected at their passage by the previously selected sensor means 40 which actuate the relevant switching means 24 causing the plate element 12 to be overturned and consequently the unloading thereof to take place, e.g., towards an idling roll way 42 provided upstream the previously determined collecting element.

One can easily understand that by means of a composite conveyor apparatus according to the present invention, in the absence of any sensor means and of any automatic means for causing the switching elements to move to and fro, a positioning of the individual switching elements can be carried out before the conveyor apparatus is started up, so that the plate elements can be unloaded at that point wherein the overturning thereof is necessary.

We claim:

1. An apparatus having a framework for selectively conveying products, comprising:
    (a) plate type elements which are laterally positioned on the framework;
    (b) driving means for driving said plate type elements on the framework;
    (c) guide means for supporting and guiding said driving means on the framework;
    (d) a first sliding guide on the framework adapted to provide a closed loop path for said plate type elements, wherein said first sliding guide includes side walls;
    (e) a pin downwardly extending from said plate type element for engaging in said first sliding guide;

(f) a second sliding guide on the framework, wherein said second sliding guide includes side walls and is parallel to said first sliding guide and in communications with said first sliding guide wherein said pin of said plate type element is adapted to move from said first sliding guide to said second sliding guide;

(g) a diverting wall element positioning across an opening between said first and second sliding guides adapted to provide a unitary directional path between said first and said second sliding guides;

(h) a transverse support element connected to said pin of said plate type element by means of a rotatable hinge, wherein said transverse support element is attached to at least one of said driving means; and (i) a switching element having a first wall and a second wall and an actuating means, said switching element positioned between said side walls of said first sliding guide and said side walls of said second sliding guide for diverting said plate type elements from said first sliding guide to said second sliding guide, wherein said switching element comprises a first free end and a second free end so that when said switching element diverts said plate type element from said first sliding guide to said second sliding guide by said actuating means, said first free end slides in one direction relative to said first wall of said switching element and said second free end slides in a second direction relative to said second wall of said switching element for defining a continuous pathway for said plate type elements.

2. The apparatus of claim 1, wherein at least one of said driving means comprises:

(a) sprocket wheels attached to the framework; and (b) a pair of chains interlinked with said sprocket wheels, connected to said transverse support element for guiding said transverse support element and supported on said guide means.

3. The apparatus of claim 2 wherein said switching element further comprises tooth shaped elements having inside guides adapted to slidingly guide said free ends of said switching elements within said inside guides of said tooth shaped elements when said switching element slides said plate type elements from said first sliding guide to said second sliding guide wherein said free ends of said switching element comprise a pliable thin sheet of material.

4. The apparatus of claim 1, wherein said pin of said plate type element comprises a lower appendix adapted to extend inside said first sliding guide or inside at least one said second sliding guide.

5. The apparatus of claim 4, wherein said lower appendix of said pin comprises a ball shape.

6. The apparatus of claim 1 further comprising:

(a) a first stationary diverting wall inside said first sliding guide at the end of the apparatus, wherein said first stationary diverting wall inclines towards an opening in at least one of said second sliding guides; and (b) a second stationary diverting wall downstream of said first stationary diverting wall connected to and inclined towards a further opening between said first and second sliding guides.

7. The apparatus of claim 1 further comprising a sensor means for detecting the passage of said plate type element and actuating said actuating means of said switching means, wherein said switching means is preselected.

8. The apparatus of claim 1 further comprising a collecting roll way positioned adjacent and parallel to at least one of said second sliding guides.

* * * * *